E. WALTERS.
OIL TANK CLEANER.
APPLICATION FILED DEC. 21, 1920.
1,437,372.
Patented Nov. 28, 1922.
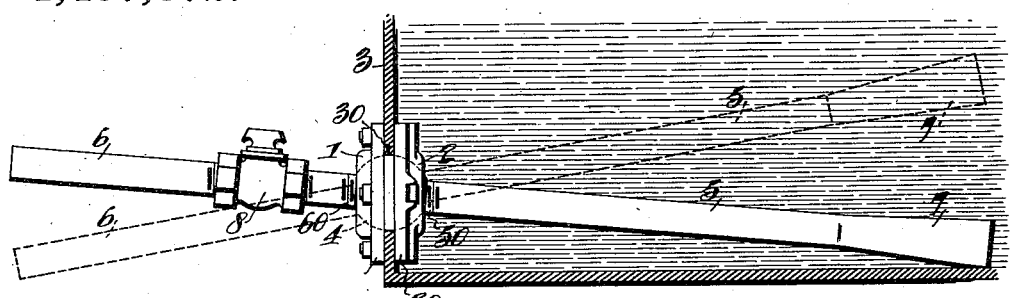
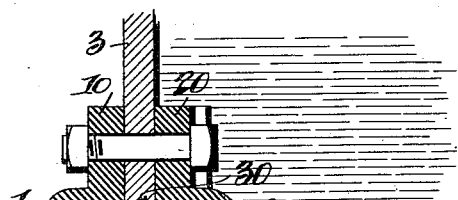
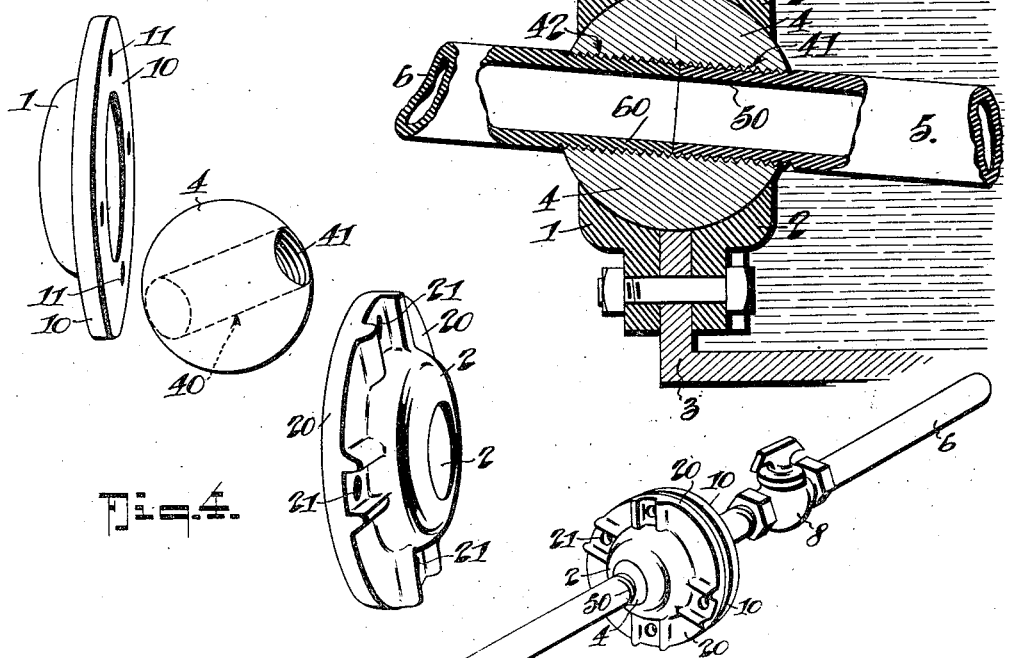
INVENTOR
Elmer Walters.
BY
ATTORNEYS Patented Nov. 28, 1922.

1,437,372

UNITED STATES PATENT OFFICE.

ELMER WALTERS, OF ELDORADO, KANSAS.

OIL-TANK CLEANER.

Application filed December 21, 1920. Serial No. 432,323.

*To all whom it may concern:*

Be it known that I, ELMER WALTERS, a citizen of the United States, residing at Eldorado, in the county of Butler and State of Kansas, have invented a new and Improved Oil-Tank Cleaner, of which the following is a specification.

My invention is an improved means for running off the semi-solid matter which always settles to the bottom of a tank or other closed receptacle filled with oil and primarily my invention has for its object to provide a means for the purpose described, whereby the said matter and other like oil deposits that settle at the bottom of the tank, may be freely agitated or stirred up from the outside of the tank and caused to be drawn off or evacuated from the tank under the liquid pressure within the said tank.

Again my invention has for its purpose to provide a means for drawing off the matter, which always settles to the bottom of a tank full of oil, in which is included a simple and effective ball and seat flange joint for the combined stirring and outflow devices, whereby the operation of stirring up the sediment desired to be withdrawn from the tank and drawing off such sediment may be conveniently and effectively accomplished from the outside of the tank, the outer portion of the draining means constituting a handle for swivelly moving the inner or entrance end of the offtake; a control device being combined with the outer or handle portion of the draining means adapted for such adjustment, whereby the contents within the tank can be kept from running out or allowed to flow from the outside of the tank at the will of the operator.

In its more complete nature, my invention embodies an improved ball and seat and flange joint for swivelly mounting the evacuating member water and oil tight in the opening provided therefor in the side of the tank.

With further minor objects in view that will hereinafter be apparent, my invention consists in the peculiar construction and novel arrangement of the parts explained in the following detailed description, specifically pointed out in the appended claims, and illustrated in the accompanying drawings, in which:

Figure 1 is a side elevation of my improvement, so much of an oil tank being indicated as is necessary to illustrate a practical application thereof.

Figure 2 is a perspective view of the ball and seat flange and the inlet and outlet pipe sections connected therewith.

Figure 3 is an enlarged vertical section of the ball and seat flange joint, applied in the tank wall, with portions of the inlet and the outlet pipe sections coupled therewith.

Figure 4 is a perspective view that shows the two combined flange joint members and the ball coupling with which the two adjacent ends of the pipe members join.

In carrying out my invention, I provide a ball and seat flange joint composed of outer and inner opposing substantially semi-circular half socket bearing members 1 and 2, each formed with an annular seat flange 10—20, respectively, and each of the said flanges provided with bolt receiving apertures 11—21 uniformly arranged with respect to their opposing flanges, whereby the inner and outer half socket bearing members may be readily secured over a hole 30 cut in the tank wall 3 and disposed about level with the floor of the tank, as is best shown in Figure 3, by reference to which it will also be observed the ball bearing 4 fits the opposing half socket bearings 1 and 2 and snugly engages the internal edge of the hole 30 in the tank wall, the construction of the several parts being such that the joint between the ball bearing 4 and the flange bearings 10 and 20 is such that a water and oil tight closure of the passage 30 is provided for an ample swivel motion or rotation of the ball 4 within the half socket flange bearing is established.

The ball bearing 4 has a central bore or passage 40 threaded at the inner and outer ends, as indicated by 41—42, the threads 42 at the inner end being provided for fitting the externally threaded ends 50 of a pipe section 5 that works inside of the tank and the threads 41 at the outer end of the bearing ball passage provides for connecting therewith the threaded end 60 of an outside pipe section 6, which latter is also used as a handle, as will presently more fully appear.

By joining the two pipes 5 and 6 with the ball bearing 4, as stated and shown, the two pipes are made as one solid member, which is swively mounted in the tank wall and the inner or receiving pipe section is adapted for being swung laterally or vertically through the deposit in the bottom of the tank and tilted, as indicated in dotted lines, in Figure 1, to permit of the free outflow of the thick liquid that is to be drawn from the tank.

To facilitate the stirring of the thickened deposit and a free outflow of such stirred up liquid, when the pipes are tilted to the running off position, the inner pipe is provided with a horizontally flared funnel-shaped entrance head 7, it being understood that tank full of oil makes heavy pressure and, when the outer or handle end of the outflow is worked around about the aperture, the inside pipe is likewise worked over the bottom of the tank where the deposit or sediment is naturally forced into the funnel end of the said inside pipe and ejected through the pipes that have the swivel connection and are clamped onto the bottom end of the tank, as shown.

In practice, the outside or handle pipe section is equipped with a gate or other closure valve 8, located preferably about a foot away from the outside of the tank, which can be readily adjusted by the operator to either close off the outflow from the tank or maintain the free outflow from the tank, as desired.

While my invention is more especially designed for use for draining off semi-solid deposits from oil tanks, it is obvious it may be readily adapted for use for drawing off accumulations of mud from the bottoms of boilers or other closure tanks.

It will be understood that the openings in the crown of the half socket members 1 and 2 are sufficiently large to permit of the desired swing of the pipe sections that are secured to the ball bearing 4.

To hold the bolts that secure the half socket members on the tank wall from turning in the apertures 21 of the inner socket bearing 2 when applying the clamp nuts on the outer ends thereof that project through the apertures 11 in the outer socket member 1, the inner face of the inner socket member has radial seats which are arranged as is clearly shown in Figures 2 and 4 for receiving the bolt heads therein, as shown in Figures 1 and 3.

To provide for ample oscillations of the pipe members 5 and 6 and the ball bearing 4, the opposite sides of the said ball bearing 4 project somewhat beyond the outer and inner faces of the socket-like clamps 1 and 2, as is best shown in Figure 3.

My invention is simple, can be easily applied to oil tanks and the various uses, the manner in which it is operatively handled and its advantages will be readily understood by those familiar with the handling of draining means of the character and for the purposes for which my invention is especially provided.

What I claim is:

1. Means for removing fluid-like sediment from tank bottoms, the said means comprising in combination with the tank having a discharge outlet, a spherical member adapted for fitting within the said outlet and forming a fluid-tight closure therefor, the said spherical member having a transverse aperture threaded throughout its length, a tubular handle having a threaded end for fitting into one end of the said transverse opening, a pipe section adapted for threading into the other end of the said transverse opening of the spherical member, the said pipe section and the tubular handle constituting an outflow passage that extends through the spherical member, a pair of oppositely disposed semi-spherical socket members that clamp over the inner and outer portions of the spherical closure member, and clamp bolts that secure the said opposite socket clamps to the inner and outer faces of the tank and surrounding the outlet therein.

2. Means for removing fluid-like sediment from tank bottoms, the said means comprising in combination with the tank having a discharge outlet, a spherical member adapted for fitting within the said outlet and forming a fluid-tight closure therefor, the said spherical member having a transverse aperture threaded throughout its length, a tubular handle having a threaded end for fitting into one end of the said transverse opening, a pipe section adapted for threading into the other end of the said transverse opening of the spherical member, the said pipe section and the tubular handle constituting an outflow passage that extends through the spherical member, a pair of oppositely disposed semi-spherical socket members that clamp over the inner and outer portions of the spherical closure member, clamp bolts that secure the said opposite socket clamps to the inner and outer faces of the tank and surrounding the outlet therein, the opposite apertured portions of the spherical member projecting beyond the adjacent inner and outer faces of the semi-spherical clamps whereby to provide for a free sweep of the outlet pipe and the handle section without engagement with the said socket members.

3. In an oil tank cleaner of the class described, the combination with the tank wall having an outlet; of a ball shaped member that fits through and constitutes a closure for the said tank wall outlet, a pair of opposing semi-circular sockets that engage the oppositely exposed portions of the ball member which project beyond the inner and outer sides of the tank wall, each socket member including an annular flange, each of the flanges having bolt apertures, the flange on the outer socket also having radial pockets cooperative with the bolt apertures, the ball member having a transverse threaded passage, the opposite ends of which project beyond the outer faces of the opposing socket members, bolts for passing through the tank wall and the apertures in the opposing socket flanges, the heads of the bolts being located in the radial pockets on the flange of the outer socket, a tubular handle having a threaded end that fits into the outer threaded end of the threaded passage through the ball, and a combined offtake and stirrer pipe having a threaded end for fitting into the inner threaded end of the ball passage, the said pipe, the handle and the ball moving as a unit during the operation of drawing off the tank sediment.

ELMER WALTERS.